(12) United States Patent
Kawachi et al.

(10) Patent No.: US 6,350,481 B1
(45) Date of Patent: Feb. 26, 2002

(54) METHOD OF MAKING A MILK CALCIUM COMPOSITION

(75) Inventors: Yasuji Kawachi; Toshihiro Kawama, both of Kawagoe; Masanori Kotani, Sayama; Kaoru Sato, Kamifukuoka; Akira Tomizawa, Iruma; Shunichi Dousako, Urawa, all of (JP)

(73) Assignee: Snow Brand Milk Products Co., Ltd., Sapporo (JP)

( * ) Notice: Subject to any disclaimer, the term of this patent is extended or adjusted under 35 U.S.C. 154(b) by 0 days.

(21) Appl. No.: 09/487,842

(22) Filed: Jan. 19, 2000

(30) Foreign Application Priority Data

Jan. 27, 1999 (JP) .............................. 11-017810

(51) Int. Cl.⁷ ............................ A23L 9/142; A23L 9/18
(52) U.S. Cl. ......................... 426/72; 426/491; 426/495; 426/580; 426/583
(58) Field of Search ........................ 426/74, 491, 495, 426/583, 580

(56) References Cited

U.S. PATENT DOCUMENTS 5,064,674 A * 11/1991 Girsh ......................... 426/491
5,912,032 A * 6/1999 Komatsu et al. ............... 426/74
5,958,477 A * 9/1999 Muromachi et al. ......... 426/491

FOREIGN PATENT DOCUMENTS

| EP | 0 686 396 A1 | 12/1995 | |
| FR | 2 331 963 | * 11/1975 | 426/491 |

OTHER PUBLICATIONS

R.L. Brandsma, et al. Depletion of Whey Proteins and Calcium by Microfiltration of Acidified Skim Milk prior to Cheese Making, Journal of Dairy Science, vol. 82, No. 10, 1999, pp. 2063–2069.

* cited by examiner

*Primary Examiner*—Helen Pratt
(74) *Attorney, Agent, or Firm*—Knobbe, Martens, Olson and Bear, LLP.

(57) ABSTRACT

Milk is concentrated by filtering with an ultrafiltration (UF) membrane, after which casein is removed by acidification and the resulting liquid is concentrated and/or dried to produce a milk calcium composition having the following components' ratios (1) and (2):

(1) $-1.3 \leq \log\{(\%$ by weight calcium in composition$)/(\%$ by weight protein in composition$)\} \leq 0.26$;

(2) $0.9 \leq \log\{(\%$ by weight calcium in composition$)/(\%$ by weight sodium in composition$)\}$.

6 Claims, No Drawings

METHOD OF MAKING A MILK CALCIUM COMPOSITION

BACKGROUND OF THE INVENTION

1. Field of the Invention

The present invention relates to a milk calcium composition obtained from milk and a method for producing the same.

The milk calcium composition of the present invention can be added to a drink or food product for calcium fortification since it is highly dispersible and tasty.

2. Description of the Related Art

Calcium intake by the Japanese is currently below the nutritional requirement of 650 mg a day, and this level is difficult to attain from the current average Japanese diet. Since the absorption rates of calcium varies by its origin, it is necessary to choose a form of calcium with a high absorption rate.

Calcium in milk is drawing attention because of its high absorption rate. In milk, 60 to 70% of the calcium is bound to casein, or is incorporated into casein micelles forming colloidal calcium. These forms are considered to make calcium highly utilizable in the body. However, the conventional isolation and purification of calcium from milk produce insoluble calcium phosphate, which causes a marked deterioration in its quality by inducing recoagulation or crystal growth when added to drinks or food products.

Therefore, various attempts have been made to develop calcium compositions which are derived from milk and which are highly dispersible. Examples of methods for producing such calcium compositions include a method in which milk or skimmed milk is acidified or treated with rennin to remove casein by coagulation and precipitation, the resultant whey or supernatant is filtered through a UF membrane, then the filtrate is recovered and neutralized to obtain a calcium component as a precipitate (Japanese Patent Publication No. 3-24191/1991); a method for producing calcium-fortified milk drinks, in which the proteins in whey or milk supernatant are removed by treating with an ion exchange resin, a UF membrane or the like, then the lactose is crystallized and the solution is neutralized and filtered through a UF membrane or microfiltration (MF) membrane (Japanese Patent Laid-open No. 9-23816/1997); a method for recovering milk minerals in which a supernatant prepared by acidification is filtered through a UF membrane, organic acids are added to the filtrate to adjust the pH below 3.0, then the filtrate is concentrated and lactose is removed (Japanese Patent Laid-open No. 60-232052/1985); a method for recovering milk minerals, in which whey or milk supernatant is adjusted to a pH of 3.5 to 8.5, then filtered through a UF membrane to obtain a filtrate, or whey or milk supenatural is filtered through a UF membrane after which the pH of the filtrate is adjusted to pH 3.0 to 8.5, then the resultant filtrate is concentrated and lactose is removed (Japanese Patent Laid-open No. 63-87944/1988; Japanese Patent Laid-open No. 63-87945/1988); a method for producing milk-derived calcium which is soluble at a pH lower than 4.6, in which whey or milk supernatant, or the filtrate obtained by filtering whey or milk supernatant through a membrane is concentrated by heating, then the lactose is removed (Japanese Patent Laid-open No. 3-83564/1991); and a method in which milk supernatant prepared by acidification is heated, then neutralized to form insoluble minerals (Japanese Patent Laid-open No. 59-34848/1994 and Japanese Patent Publication No. 2-60303/1990).

Although it is possible to recover milk-derived calcium using any of these methods, the calcium thus obtained is poorly soluble or dispersible and would precipitate when used in drinks or food products such as desserts, which causes deterioration in quality by inducing precipitation. Moreover, minerals, including calcium, partly precipitate by removing lactose, which decreases calcium recovery.

Examples of commercial calcium compositions derived from milk include LACTOVAL™ (18.6% by weight calcium, 6.3% by weight proteins, a product of DMV) and ALAMIN™ 995 (25% by weight calcium, 10.3% by weight proteins, a product of New Zealand Dairy Industry). However, aggregation of the calcium in these compositions is controlled by simple physical refining or emulsification such that calcium solubility is not necessarily improved. ALANATE™ 385 (1.4% by weight calcium, 92% by weight proteins, a product of New Zealand Dairy Industry) is another commercial calcium composition derived from milk. However, this calcium composition is a calcium caseinate, which is produced by dispersing acid casein in water, then dissolving it with calcium hydroxide, such that the major protein component is casein, which results in an undesirable unique odor known as "casein odor."

SUMMARY OF THE INVENTION

In the course of an intensive study to resolve the above-mentioned problems in milk-derived calcium, the present inventor found that by maintaining the calcium-protein ratio and the calcium-sodium ratio in the composition in a certain range, a milk calcium composition which is highly dispersible and tasty could be obtained. The present invention was thus accomplished. Accordingly, among others, an objective of the present invention is to provide a milk calcium composition obtained from milk, which is highly dispersible and tasty, and a method for producing the same.

It is known that about 66% of calcium in milk is generally present in a form of colloidal calcium and bound to casein (Shu-ichi Uenokawa et al., editors, "Science of Milk," p. 55, 1994, National Agricultural Cooperative Dairy Plant Association). In the present invention, milk is concentrated by filtering through a UF membrane to recover this casein-bound calcium in a high concentration. In LF-membrane filtration, calcium bound to proteins or casein cannot pass through the UF membrane while low molecular components such as lactose, minerals and amino acids pass through the LF membrane; thus, calcium can be recovered in a high concentration. The degree of concentration is preferably about 1.5–6.0 times for skimmed milk or partially skimmed milk. If less than 1.5, the concentration of calcium relative to total solids is low, which is not suitable for practical use. Conversely, a concentration more than 6.0 times is undesirable because the concentrated milk becomes highly viscous, which markedly decreases concentration efficiency. In order to further remove low molecular components other than calcium, desalting by LF-membrane filtration may be carried out while adding water. Such desalting increases the concentration of calcium relative to total solids. Also, reconstituted skimmed milk can be used in the same manner as skimmed milk or partially skimmed milk. A milk protein concentrate (MPC) having an increased protein content can also be used after reconstitution.

Next, the concentrated milk is subjected to acid treatment, and then the precipitated casein is removed to obtain whey.

The term "acid treatment" as used in the present invention refers to a process to precipitate casein, in which the pH is adjusted to 3.0 to 5.6 to precipitate casein by adding an inorganic acid such as hydrochloric acid, sulfuric acid, phosphoric acid and boric acid, or an organic acid such as acetic acid, lactic acid, gluconic acid and malic acid, or by inoculating lactic acid bacteria for lactic acid fermentation. In particular, the use of acids having a high chelating activity, such as citric acid, can increase the calcium concentration in whey because these acids can separate casein-bound calcium intensively. Further, higher calcium recovery can be attained by adding the wash obtained from casein by washing the precipitated casein with water to the whey.

In order to effectively utilize milk components, if necessary, those components such as lactose and minerals removed in the UF-membrane filtration can be added to the whey, and its solid content is adjusted, then the pH of the whey is adjusted preferably to 6.0 to 9.0. The milk calcium composition is poorly dispersed and less tasty if the pH of the whey is below 6.0. A whey pH of higher than 9.0 is not desirable because it fouls the taste of the milk calcium composition.

For the pH adjustment, alkaline solutions, such as sodium hydroxide, potassium hydroxide, calcium hydroxide, sodium carbonate, sodium bicarbonate, magnesium hydroxide, and sodium citrate can be used.

The whey is then concentrated by filtering through a nanofiltration (NF) membrane or a reverse osmosis (RO) membrane, or by concentrating under vacuum to obtain a milk calcium composition. An NF membrane is preferably used for the concentration of the whey, because the NF membrane allows monovalent salts such as sodium to filter through, but concentrates divalent salts such as calcium, wherein calcium can be effectively concentrated. In order to further increase the calcium concentration in the milk calcium composition, desalting by filtration with an NF membrane, or electrodialysis followed by concentration by RO membrane filtration or under vacuum can be carried out.

The concentrate thus obtained can be used as a milk calcium composition without further processing. Also, this concentrate can be frozen to produce a frozen product, or spray-dried or freeze-dried to produce a powdered product to be used as a milk calcium composition.

This milk calcium composition contains components in the following ratios (1) and (2) and is highly dispersible and tasty.

(1) $-1.3 \leq \log\{(\%$ by weight calcium in composition)/(% by weight protein in composition)$\} \leq 0.26$ (2) $0.9 \leq \log\{(\%$ by weight calcium in composition)/(% by weight sodium in composition)$\}$.

The reason that the milk calcium composition of the present invention is highly dispersible and tasty is because aggregation among calcium and the growth of calcium crystals are controlled by the presence of a certain amount of whey proteins, and the content of salts, such as sodium, which affects the taste, are reduced to a certain level. Thus, a milk calcium composition of practical use can be provided.

If the value of log{(% by weight calcium in composition)/(% by weight protein in composition)} for the milk calcium composition is smaller than −1.3, the calcium content relative to milk solid is low, and thus the composition has no practical value. If the value of log{(% by weight calcium in composition)/(% by weight protein in composition)} for the milk calcium composition exceeds 0.26, the calcium is poorly dispersible. If the value of log{(% by weight calcium in composition)/(% by weight sodium in composition)} for the milk calcium composition is smaller than 0.9, the undesirable taste resulting from salts, such as sodium, is intensified.

DETAILED DESCRIPTION OF THE PREFERRED EMBODIMENT

In this invention, milk is first concentrated by UF-membrane filtration. Skim milk, partially skimmed milk, or reconstituted skim milk prepared by dissolving skim milk powder in warm water can be used singly or as a mixture thereof. Also, whey or milk components can be mixed to these milk materials. Milk to be concentrated by UF-membrane filtration is preferably pasteurized by heat or subjected to MF-membrane filtration to remove bacteria before use. Next, the concentrated milk is treated with acid, then the precipitated casein is removed to obtain whey. If necessary, the solid content is adjusted by adding these components which are removed by UF-membrane filtration, such as lactose or minerals, are added, and an alkali solution is added to adjust the pH. Finally, the resultant whey is concentrated and dried, if necessary, to obtain the milk calcium composition of the present invention.

This milk calcium composition can be added to drinks or food products for calcium fortification since the composition is highly dispersible and tasty. The content of the milk calcium composition in drinks or food products is preferably about 0.2 to 30% by weight. The taste is affected if the content exceeds 30% by weight.

The present invention will be explained in detail in the following examples.

EXAMPLE 1

Skim milk (300 kg) was heated to 50C, filtered with an MF membrane with a pore size of 1.4 μm (IP19-40, a product of Membralox) to remove bacteria, and then concentrated by 6 times using a UF membrane having a fractionation molecular weight of 10 kDa (DK3840C, a product of Desalination), then desalted using the same UF membrane by an apparent hydration rate of 1.5 times to obtain 46 kg of UF-prepared milk. To this UF-prepared milk, 2.5 kg of 1N hydrochloric acid were added to adjust the pH to 4.51, then 17.3 kg of acid casein were obtained as a precipitate and 31.2 kg of acid whey as a supernatant. Next, to the acid whey recovered as a supernatant, 900 g of 1 N sodium hydroxide were added to adjust the pH to 6.40, after which the whey was concentrated by 3 times using an NP membrane (Desal-5, a product of Desalination), then desalted by an apparent hydration rate of 3 times using the same NF membrane. Finally this concentrated acid whey was spray-dried to obtain a milk calcium composition of the present invention (product 1 of the present invention).

This milk calcium composition contained 69.7% by weight protein, 9.7% by weight lactose/and 9.6% by weight minerals, (3.9% by weight calcium, 0.17% by weight sodium), and had a value for log{(% by weight calcium in composition)/(% by weight protein in composition)} of −1.25 and a value for log{(% by weight calcium in composition)/(% by weight sodium in composition )} of 1.36.

EXAMPLE 2

Skim milk (300 kg) was heated to 50C, filtered with an MF membrane with a pore size of 1.4 μm (IP19-40, a product of Membralox) to remove bacteria, and then concentrated by 5 times using a UF membrane having a fractionation molecular weight of 10 kDa (DK3840C, a product of Desalination) to obtain 56 kg of UF-prepared milk. To this UF-prepared milk, 3.1 kg of 1N citric acid added to adjust the pH to 4.51, then 20.6 kg of acid casein were obtained as a precipitate and 38.5 kg of acid whey as a supernatant. Next, to the acid whey recovered as a supernatant, 1,050 g of 1 N sodium hydroxide were added to adjust the pH to 6.40, after which the whey was concentrated by 3 times using an NF membrane (Desal-5, a product of Desalination), then desalted by an apparent hydration rate of 2 times using the same NF membrane. Finally this concentrated acid whey was spray-dried to obtain a milk calcium composition of the present invention (product 2 of the present invention).

This milk calcium composition contained 26.5% by weight protein, 41.9% by weight lactose and 14.1% by weight minerals, (4.6% by weight calcium, 0.55% by weight sodium), and had a value for log{(% by weight calcium in composition)/(% by weight protein in composition)} of −0.76 and a value for log{(% by weight calcium in composition)/(% by weight sodium in composition )} of 0.92.

EXAMPLE 3

Skim milk (300 kg) was heated to 50C, filtered with an MF membrane with a pore size of 1.4 μm (IP19-40, a product of Membralox) to remove bacteria, and then concentrated by 3 times using a UF membrane having a fractionation molecule weight of 10 kDa (DK3840C, a product of Desalination), then desalted using the same UF membrane by an apparent hydration rate of 3 times to obtain 45 kg of UF-prepared milk. This UF-prepared milk was heated to 32C, and inoculated with 5.3 units of a frozen concentrated starter (CH-N 11, a product of Christian Hansen). The resulting curd was cut when the pH reached to 4.51 to recover 65.2 kg of whey. Next, to the whey recovered, 1,680 g of 1 N sodium hydroxide were added to adjust the pH to 6.40, after which the whey was concentrated by 5 times using an NF membrane (Desal-5, a product of Desalination), then desalted by an apparent hydration rate of 5 times using the same NF membrane. Finally this concentrated acid whey was spray-dried to obtain a milk calcium composition of the present invention (product 3 of the present invention).

This milk calcium composition contained 21.2% by weight protein, 42.3% by weight lactose and 9.1% by weight minerals, (3.1% by weight calcium, 0.28% by weight sodium), and had a value for log{(% by weight calcium in composition)/(% by weight protein in composition)} of −0.84 and a value for log{(% by weight calcium in composition)/(% by weight sodium in composition )} of 1.04.

EXAMPLE 4

Skim milk (300 kg) was heated to 50C, filtered with an MF membrane with a pore size of 1.4 μm (IP19-40, a product of Membralox) to remove bacteria, and then concentrated by 6 times using a UF membrane having a fractionation molecular weight of 10 kDa (DK3840C, a product of Desalination), then desalted using the same UF membrane by an apparent hydration rate of 1.5 times to obtain 46 kg of UF-prepared milk. To this UF-prepared milk, 2.5 kg of 1N hydrochloric acid were added to adjust the pH to 4.51, then 17.3 kg of acid casein were obtained as a precipitate and 31.2 kg of acid whey as a supernatant. Next, to the acid whey recovered as a supernatant, 2.4 kg of lactose and 900 g of 1 N sodium hydroxide were added to adjust the pH to 6.40, after which the whey was concentrated by 3 times using an NF membrane (Desal-5, a product of Desalination), then desalted by an apparent hydration rate of 3 times using the same NF membrane. Finally this concentrated acid whey was spray-dried to obtain a milk calcium composition of the present invention (product 4 of the present invention).

This milk calcium composition contained 29.6% by weight protein, 44.3% by weight lactose and 9.4% by weight minerals, (3.6% by weight calcium, 0.16% by weight sodium), and had a value for log{(% by weight calcium in composition)/(% by weight protein in composition)} of −0.92 and a value for log{(% by weight calcium in composition)/(% by weight sodium in composition)} of 1.35.

TEST EXAMPLE 1

Average diameters of particles of the products 1–4 of the present invention obtained in Examples 1–4 were measured. Average diameters of particles of commercial milk calcium compositions were also measured for controls.

Control product 1, LACTOVAL™ (a product of DMV), contains 6.3% by weight protein, 18.6% by weight calcium and 0.27% by weight sodium and has a value for log{(% by weight calcium in composition)/(% by weight protein in composition)} of 0.47 and a value for log{(% by weight calcium in composition)/(% by weight sodium in composition)} of 1.84.

Control product 2, ALAMIN™ 995 (a product of New Zealand Dairy Industry), contains 10.3% by weight protein, 25.0% by weight calcium and 0.4% by weight sodium and has a value for log{(% by weight calcium in composition)/(% by weight protein in composition)} of 0.39 and a value for log{(% by weight calcium in composition)/(% by weight sodium in composition)} of 1.80.

Control product 3, ALANATE™ 385 (a product of New Zealand Dairy Industry), contains 92.0% by weight protein, 1.4% by weight calcium and 0.01% by weight sodium and has a value for log{(% by weight calcium in composition)/(% by weight protein in composition)} of −1.82 and a value for log{(% by weight calcium in composition)/(% by weight sodium in composition)} of 2.15.

Control product 4, an acid whey powder (a product of Kyodo Nyugyo), contains 11.7% by weight protein, 2.4% by weight calcium and 1.1% by weight sodium and has a value for log{(% by weight calcium in composition)/(% by weight protein in composition)} of −0.69 and a value for log{(% by weight calcium in composition)/(% by weight sodium in composition)} of 0.34.

A solution of each milk calcium composition was adjusted to have a concentration of 5% by weight, and homogenized at a pressure of 100 kg/cm$^2$, and then the average diameter of the particles was measured by the laser diffraction/dispersion method using a laser diffraction-type particle distribution measuring device (SALD-2000A, Shimadzu Corp.). Results are shown in Table 1.

TABLE 1

| | |
|---|---|
| Product 1 of the present invention | 0.567 (μm) |
| Product 2 of the present invention | 0.147 |
| Product 3 of the present invention | 0.227 |
| Product 4 of the present invention | 0.384 |
| Control product 1 | 2.72 |
| Control product 2 | 15.4 |
| Control product 3 | 6.41 |
| Control product 4 | 0.611 |

Milk calcium compositions having an average particle diameter of greater than 1 μm are poorly dispersible, which results in loss during manufacturing and a rough feeling to the tongue. All of the products 1–4 of the present invention had an average particle diameter of smaller than 1 μm and were highly dispersible, while controls 1–3 had the average particle diameters of greater than 1 μm and were poorly dispersible.

TEST EXAMPLE 2

An organoleptic evaluation by 10 professional panellists was carried out on products 1–4 of the present invention and control products 1–4 used in Test Example 1.

The evaluations were for "roughness," "whey odor," and "comprehensive taste." Averages of the scores according to the following standards were obtained.

a. "Roughness": Very rough (1), fairly rough (2), palpable roughness to the tongue (3), slightly palpable roughness to the tongue(4), and no palpable roughness to the tongue (5).

b. "Whey odor": Very strong odor (1), fairly strong odor (2), palpable whey order (3), slightly palpable whey odor (4), and no whey odor (5).

c. "Comprehensive taste": Very bad (1), fairly bad (2), average (3), fairly good (4), very good (5).

The evaluations were carried out with aqueous solutions at a concentration of 0.5% by weight for "roughness," 0.3% by weight for "whey odor" and 10% by weight for "general taste."

Results are shown in Table 2.

TABLE 2

|  | Roughness | Whey odor | Comprehensive taste |
|---|---|---|---|
| Product 1 of the present invention | 4.1 | 4.4 | 4.0 |
| Product 2 of the present invention | 4.4 | 4.5 | 4.3 |
| Product 3 of the present invention | 4.4 | 4.3 | 4.2 |
| Product 4 of the present invention | 4.2 | 4.4 | 4.2 |
| Control product 1 | 1.3 | 4.2 | 1.8 |
| Control product 2 | 1.6 | 4.2 | 1.6 |
| Control product 3 | 1.4 | 4.0 | 2.4 |
| Control product 4 | 3.0 | 1.1 | 2.8 |

Results showed that the products 1–4 of the present invention had less roughness and more highly dispersible as compared with control products 1–4. Furthermore, although products 1–4 of the present invention were milk calcium compositions prepared from whey, they had virtually no whey odor and were evaluated to be comprehensively preferable to any control products.

Further, control product 3 had a strong casein odor and control product 4 was very salty.

EXAMPLE 5

Skim milk powder (900 g) was dissolved in warm water (40C) to prepare 10 kg of reconstituted fat-free milk (3.1% by weight protein, 0.1% by weight calcium). Milk calcium compositions of products 1–4 of the present invention obtained in Examples 1–4 were each added to 1000 g of this reconstituted fat-free milk to make the calcium content 0.15% by weight and the admixtures were homogenized at a pressure of 100 kg/cm² to obtain calcium-fortified nonfat milk preparations.

Prepared calcium-fortified nonfat preparations are as follows:

Product 5 of the present invention: calcium-fortified nonfat milk prepared by adding 12.8 g of the milk calcium composition of product 1 of the present invention.

Product 6 of the present invention: calcium-fortified nonfat milk prepared by adding 10.9 g of the milk calcium composition of product 2 of the present invention.

Product 7 of the present invention: calcium-fortified nonfat milk prepared by adding 16.1 g of the milk calcium composition of product 3 of the present invention.

Product 8 of the present invention: calcium-fortified nonfat milk prepared by adding 13.9 g of the milk calcium composition of product 4 of the present invention.

TEST EXAMPLE 3

Average diameters of particles of the products 5–8 of the present invention obtained in Example 5 were measured. Calcium-fortified nonfat milk preparations were also prepared by mixing commercial milk calcium compositions to make the calcium content 0.15% by weight and by homogenizing resulting admixtures at a pressure of 100 kg/cm². Average diameters of particles of the calcium-fortified nonfat milk preparations were also measured for controls.

Control product 5: calcium-fortified nonfat milk prepared by adding 2.69 g of LACTOVAL™ (a product of DMV).

Control product 6: calcium-fortified nonfat milk prepared by adding 2.00 g of ALAMIN™ 995 (a product of New Zealand Dairy Industry).

Control product 7: calcium-fortified nonfat milk prepared by adding 35.7 g of ALANATE™ 385 (a product of New Zealand Dairy Industry).

Control product 8: calcium-fortified nonfat milk prepared by adding 20.83 g of an acid whey powder (a product of Kyodo Nyugyo).

The average diameter of the particles in calcium fortified nonfat milk was measured by the laser diffraction/dispersion method using a laser diffraction-type particle distribution measuring device (SALD-2000A, Shimadzu Corp.).

Results are shown in Table 3.

TABLE 3

| Product 5 of the present invention | 0.485 ($\mu$m) |
|---|---|
| Product 6 of the present invention | 0.203 |
| Product 7 of the present invention | 0.312 |
| Product 8 of the present invention | 0.387 |
| Control product 5 | 2.54 |
| Control product 6 | 12.8 |
| Control product 7 | 5.67 |
| Control product 8 | 0.587 |

The products 5–8 of the present invention had an average particle diameter of smaller than 1 $\mu$m and were highly dispersible, while controls 5–7 had the average particle diameters of greater than 1 $\mu$m and were poorly dispersible.

TEST EXAMPLE 4

An organoleptic evaluation for "roughness" and "comprehensive taste" was carried out on products 5–8 of the present invention and control products 5–8 in the same way as in Test Example 2.

TABLE 4

|  | Roughness | Comprehensive taste |
|---|---|---|
| Product 5 of the present invention | 4.8 | 4.1 |
| Product 6 of the present invention | 4.6 | 4.4 |
| Product 7 of the present invention | 4.6 | 4.4 |
| Product 8 of the present invention | 4.7 | 4.2 |
| Control product 5 | 1.1 | 2.0 |
| Control product 6 | 1.3 | 1.9 |
| Control product 7 | 1.2 | 2.7 |
| Control product 8 | 4.2 | 3.1 |

Results showed that the products 5–8 of the present invention had less roughness and more highly dispersible as compared with control products 5–8. Furthermore, they were evaluated to be comprehensively preferable to any control products.

Further, control product 7 had a strong casein odor and control product 8 had a strong whey odor and salty taste.

As shown above, the present invention can provide a milk calcium composition which is highly dispersible and tasty, and is suitable to admix with drinks and food products for calcium fortification. Furthermore, a method for producing the milk calcium composition of the present invention does not require the lactose-removing process after whey preparation because UF-membrane filtration decreases the lactose content. This prevents a reduced calcium recovery rate and protein denaturation resulting from concentration or heating required in the lactose-removing process, and is thus highly practical in terms of product quality and manufacturing. Further, the milk calcium composition of the present invention can be added to drinks and food products for calcium fortification without causing any problem in solubility or taste.

What is claimed is:

1. A method for producing a milk calcium composition, comprising the steps of:

concentrating milk by filtering with an ultrafiltration (UF) membrane to increase the concentration of casein-bound calcium while removing low molecular components including lactose, minerals and amino acids;

removing casein from the concentrated milk by acidification to dissociate calcium from the casein-bound calcium;

concentrating the resulting liquid by a nanofiltration (NF) membrane to increase the concentration of calcium while removing monovalent salts to satisfy the follow ratios:

(1) $-1.3 \leq \log\{(\%$ by weight calcium in composition$)/(\%$ by weight protein composition$)\} \leq 0.26$;

(2) $0.9 \leq \log\{(\%$ by weight calcium in composition$)/(\%$ by weight sodium in compositon$)\}$; and optionally drying the concentrated liquid.

2. The method as claimed in claim 1 wherein the acidification is carried out with citric acid.

3. The method as claimed in claim 2 wherein after removing casein, the pH is adjusted to 6.0–9.0 and the resulting liquid is concentrated and/or dried.

4. The method as claimed in claim 2 wherein after removing casein, the solid content of the supernatant is adjusted by adding the components which have passed through the UF membrane, the pH is adjusted to 6.0–9.0, then the resulting liquid is concentrated and/or dried.

5. The method as claimed in claim 1 wherein after removing casein, the pH is adjusted to 6.0–9.0 and the resulting liquid is concentrated and/or dried.

6. The method as claimed in claim 1 wherein after removing casein, the solid content of the supernatant is adjusted by adding the components which have passed through the UF membrane, the pH is adjusted to 6.0–9.0, then the resulting liquid is concentrated and/or dried.

* * * * *